(12) United States Patent
Olsen

(10) Patent No.: US 7,916,186 B2
(45) Date of Patent: Mar. 29, 2011

(54) ANTI-ECLIPSE CIRCUITRY WITH TRACKING OF FLOATING DIFFUSION RESET LEVEL

(75) Inventor: Espen A. Olsen, Oslo (NO)

(73) Assignee: Micron Technology, Inc., Boise, ID (US)

( * ) Notice: Subject to any disclaimer, the term of this patent is extended or adjusted under 35 U.S.C. 154(b) by 1035 days.

(21) Appl. No.: 11/100,429

(22) Filed: Apr. 7, 2005

(65) Prior Publication Data

US 2006/0227226 A1  Oct. 12, 2006

(51) Int. Cl.
*H04N 5/217* (2011.01)
(52) U.S. Cl. ........................................................ 348/241
(58) Field of Classification Search .................. 348/241, 348/245, 246, 243, 222.1; 429/241, 245, 429/246, 243, 222.1
See application file for complete search history.

(56) References Cited

U.S. PATENT DOCUMENTS

| | | | |
|---|---|---|---|
| 5,523,570 A * | 6/1996 | Hairston | 250/349 |
| 6,452,152 B1 | 9/2002 | Yang et al. | |
| 7,075,474 B2 * | 7/2006 | Yamagata et al. | 341/169 |
| 7,170,556 B2 * | 1/2007 | Kokubun et al. | 348/241 |
| 7,280,140 B2 * | 10/2007 | Henderson | 348/241 |
| 7,304,674 B2 * | 12/2007 | Mentzer et al. | 348/300 |
| 7,385,636 B2 * | 6/2008 | Xu | 348/241 |
| 2003/0080279 A1 * | 5/2003 | Afghahi | 250/208.1 |
| 2003/0179159 A1 * | 9/2003 | Ohsawa et al. | 345/55 |
| 2004/0036783 A1 | 2/2004 | Barna | |
| 2005/0168607 A1 * | 8/2005 | Han | 348/308 |
| 2005/0237400 A1 * | 10/2005 | Blerkom et al. | 348/241 |

FOREIGN PATENT DOCUMENTS

| | | |
|---|---|---|
| CN | 1534793 A | 10/2004 |
| EP | 1 840 969 A1 | 10/2004 |
| JP | 10-164442 A | 6/1998 |
| JP | 2000-287131 A | 10/2000 |
| JP | 2001-24947 A | 1/2001 |
| JP | 2004-7394 A | 1/2004 |
| JP | 2004-222273 A | 8/2004 |
| JP | 2004-320346 A | 11/2004 |
| JP | 2005-223908 A | 8/2005 |

OTHER PUBLICATIONS

Office Action with Translation for Korean Patent Application 10-2007-7025525 dated May 4, 2009.
Chinese Office Action for CN 200680015581.X, Aug. 28, 2009.

* cited by examiner

*Primary Examiner* — Lin Ye
*Assistant Examiner* — Amy Hsu
(74) *Attorney, Agent, or Firm* — Dickstein Shapiro LLP

(57) ABSTRACT

An anti-eclipse circuit for an imager is formed from pixel circuitry over the same semiconductor substrate as the imaging pixels. More specifically, two adjacent pixel circuits are modified to form an amplifier. One input of the amplifier is adapted to receive a reset signal from one of the pixel circuits while another input is adapted to be set at a predetermined offset voltage from the output of the amplifier. The amplifier is preferably a unity gain amplifier, so that the output of the amplifier set to a voltage level equal to the predetermined offset from the voltage level of the reset signal. Accordingly, the anti-eclipse circuit outputs a reference voltage at predetermined level from the reset voltage of a pixel and does not need to be calibrated for fabrication related variances in reset voltages.

22 Claims, 8 Drawing Sheets

ANTI-ECLIPSE CIRCUITRY WITH TRACKING OF FLOATING DIFFUSION RESET LEVEL

FIELD OF INVENTION

The present invention relates generally to pixel architectures for semiconductor imagers. More specifically, the present invention relates to an anti-eclipse system for image sensors.

BACKGROUND OF THE INVENTION

FIG. 1 is an illustration of a conventional four transistor (4T) pixel 100. The pixel 100 includes a light sensitive element 101, shown as a photodiode, a floating diffusion node C, and four transistors: a transfer transistor 111, a reset transistor 112, a source follower transistor 113, and a row select transistor 114. The pixel 100 accepts a TX control signal for controlling the conductivity of the transfer transistor 111, a RST control signal for controlling the conductivity of the reset transistor 112, and a ROW control signal for controlling the conductivity of the row select transistor 114. The voltage at the floating diffusion node C controls the conductivity of the source follower transistor 113. The output of the source follow transistor 113 is presented at node B when the row select transistor 114 is conducting.

The states of the transfer and reset transistors 111, 112 determine whether the floating diffusion node C is coupled to the light sensitive element 101 for receiving a photo generated charge generated by the light sensitive element 101 following a charge integration period, or a source of pixel power VAAPIX from node A during a reset period.

The pixel 100 is operated as follows. The ROW control signal is asserted to cause the row select transistor 114 to conduct. At the same time, the RST control signal is asserted while the TX control signal is not asserted. This couples the floating diffusion node C to the pixel power VAAPIX at node A, and resets the voltage at node C to the pixel power VAAPIX. The pixel 100 outputs a reset signal Vrst at node B. As will be explained in greater detail below in connection with FIG. 2, node B is typically coupled to a column line 215 (FIG. 2) of an imager 200.

After the reset signal Vrst has been output, the RST control signal is not asserted. The light sensitive element 101 is exposed to incident light and accumulates charges based on the level of the incident light during a charge integration period. After the charge integration period, the TX control signal is asserted. This couples the floating diffusion node C to the light sensitive element 101. Charge flows through the transfer transistor 111 and diminishes the voltage at the floating diffusion node C. The pixel 100 outputs a photo signal Vsig at node B. The reset and photo signals Vrst, Vsig are different components of the overall pixel output (i.e., Voutput=Vrst−Vsig), which is typically processed by an imager 200 (FIG. 2) as explained in greater detail below.

FIG. 2 is an illustration of an imager 200 that includes a plurality of pixels 100, 100' forming a pixel array 201. The pixel array 201 includes an outer region 201a of dark (i.e., non-image) pixels 100' and an inner region 201b of image pixels 100. Due to space limitations the pixel array 201 is drawn as a 4×4 array. One skilled in the art would recognize that in most imagers 200, both the outer 201a and inner 201b regions of the pixel array 201 would ordinarily include many more pixels 100', 100.

The dark pixels 100' are essentially identical to the image pixels 100 (FIG. 1) except they are not used to capture an image. Typically, the light sensitive element 101 of a dark pixel 100' is shielded from incident light. As shown in FIG. 2, dark pixels 100' are also coupled to the column lines 215. In some imagers the outputs produced by the dark pixels 100' are not further processed, while in other imagers the outputs are processed as non-image signals to provide a dark signal level.

The imager 200 also includes row circuitry 210, column circuitry 220, a digital conversion circuit 230, a digital processing circuit 240, and a storage device 250. The imager 200 also includes a controller 260. The row circuitry 210 selects a row of pixels 100, 100' from the pixel array 201. The pixels 100, 100' in the selected row output their reset and pixel signals Vrst, Vsig to the column circuitry 220, via column lines 215. The column circuit 220 samples and holds the reset and pixel signals Vrst, Vsig. For signals that were produced by an image pixel 100, the column circuitry 220 also forms the pixel output (Vrst−Vsig), which is presented to the digital conversion circuit 230 via lines 216. The digital conversion circuit 230 converts the pixel output signals to corresponding digital values, and may include for example, plural analog-to-digital converters. The digital values are then processed by the digital processing circuit 240, which stores the processed values in the storage device 250 (for output). The controller 260 is coupled to the pixel array 201, row circuitry 210, column circuitry 220, digital processing circuit 240, and storage device 250, and provides control signals to perform the above described processing. Signals which are produced from a non-image pixel 100' are either not sampled and held and are not subsequently processed by the digital conversion circuit 230, digital processing circuit 240, nor stored in the storage device 250, or are sampled and held and processed to provide a dark signal level.

A pixel 100 is susceptible to a type of distortion known as eclipsing. Eclipsing refers to the distortion arising when a pixel outputs a pixel signal corresponding to a dark pixel even though bright light is incident upon the pixel. Eclipsing can occur when a pixel is exposed to bright light, as the light sensitive element 101 can produce a large quantity of photo-generated charge. While the pixel 100 is outputting the reset signal Vrst, a portion of the photogenerated charge produced by the light sensitive element 101 during an ongoing integration period may spill over the transfer transistor 111 into the floating diffusion node C. This diminishes the reset voltage at the floating diffusion node and can causes the pixel 100 to output an incorrect (i.e., diminished voltage) reset signal Vrst. This, in turn, can cause the reset and photo signals Vrst, Vsig to be nearly the same voltage. For example, the photo and reset signals Vrst, Vsig may each be approximately 0 volts. The pixel output (Vrst−Vsig) can therefore become approximately 0 volts, which corresponds to an output voltage normally associated with a dark pixel. Eclipsing is not a concern with respect to the non-image pixels 100' because their light sensitive elements 101 are shielded from incident light.

An anti-eclipse circuit can be used to minimize the effect of eclipsing. For example, since during an eclipse a pixel's reset voltage will tend to drop towards zero volts, an anti-eclipse circuit can monitor the voltage level of the reset signal. If the voltage level drop below a threshold voltage, the anti-eclipse circuit can assume the eclipsing may occur (or is occurring) and then correct the voltage level of the reset signal by pulling the reset level up to a correction voltage, thereby minimizing the eclipse effect.

FIG. 3 is a more detailed illustration of one implementation of the column circuitry 220 of FIG. 2 employing an anti eclipsing circuit. In the column circuitry 220, each column line 215 associated with an image pixel 100 is coupled, via node D, to an anti-eclipse (AE) circuit 310, a load circuit 390, and a sample and hold (SH) circuit 380. Each SH circuit 380 is also coupled, via line 216, to the digital conversion circuit 230 (FIG. 2). The load circuit 390 serves to stabilize the voltage at node D as the reset Vrst and photo Vsig signals travel between a pixel 100 and a load circuit 390 via the column line 215. The SH circuit 380 alternatively samples and holds the voltage at node D as the reset Vrst and photo Vsig signals are transmitted on column line 215 between the pixel 100 and the load circuit 390. The AE circuit 310 functions to minimize the effect of the eclipse distortion by monitoring the voltage at node D when the reset signal Vrst is conducted between the pixel 100 and the load circuit 390. If the voltage at node D drops below a predetermined threshold during the output of the reset signal Vrst, the AE circuit 310 intervenes by clamping the voltage of the reset signal Vrst to a predetermined voltage threshold. In this manner, eclipse distortion is minimized by ensuring that the reset voltage does not fall below the predetermined threshold. In the column circuitry 220, each column line 215 associated with an non-image pixel 100' is just coupled to a corresponding load circuit 390. This implementation corresponds to an imager which does not further process non-image pixels 100', although as previously noted, some imagers may process signals from non-image pixels 100'. As shown in FIG. 3, each AE circuit 310 accepts control signals AE_SHR and AE_Vref. The function of these signals will be explained below in connection with FIG. 4.

FIG. 4 is an illustration of an exemplary implementation of the AE circuit 310. The AE circuit 310 is used to selectively clamp node D to node E, thereby setting the voltage at node D to AE_Vref minus the threshold voltage of transistor 320 (transistor 330 is operating as a switch and should not appreciably affect the voltage level at node D). More specifically, if the pixel is outputting a reset signal and the reset signal level is below a predetermined voltage, the AE circuit 310 clamps the voltage at node D to AE_Vref minus the threshold voltages of transistor 320, thereby minimizing the effect of the eclipse distortion.

More specifically, the AE circuit 310 accepts pixel power VAAPIX at node E, which is coupled to one source/drain of an AE transistor 320. The AE transistor 320 is coupled in series a switch transistor 330, which in turn is coupled in series to node D. An AE threshold volrage AE_Vref is supplied to the gate of the AE transistor 320, while a control signal AE_SHR is supplied to the gate of the switch transistor 320.

The AE_SHR control signal is used to activate the AE circuit 310 by causing the AE transistor 330 to conduct only when the reset signal Vrst is being output by a pixel 100 and sampled by sample and hold circuit 380. The AE_SHR control signal may be, for example, identical to the SHR control signal generated by the control circuit 260 (FIG. 2) to control when the sample and hold circuit 380 (FIG. 3) samples and holds the reset signal Vrst. The AE_SHR control signal may be generated by the control circuit 260 (FIG. 2).

Now also referring to FIG. 5, it can be seen that the AE threshold voltage AE_Vref is generated by a circuit 500 from pixel power VAAPIX. The circuit 500 is typically a resistor based voltage divider which produces the AE threshold voltage AE_Vref from pixel power VAAPIX. In FIG. 5, the AE threshold voltage AE_Vref is controlled by the resistance of resistors 510 and 520. The AE threshold voltage AE_Vref is set to a predetermined level. If the voltage at node D drops below the level of the AE threshold voltage AE_Vref while the switch transistor 330 is conducting, the AE circuit 310 clamps the voltage at node D to AE_Vref minus the threshold voltage of transistor 320.

Thus, in order to provide an anti-eclipse function, the AE threshold voltage AE_Vref must be set at a proper level which corresponds to an offset from the nominal (i.e., not during an eclipse) reset signal voltage level of a pixel. Unfortunately, semiconductor fabrication produces variances in each integrated circuit. Differences associated with, for example, the amount of charge injected to the floating diffusion node C of a pixel during a reset operation, or threshold voltages of transistors, may alter nominal reset signal voltage level, and thus, the ideal voltage level for the AE threshold voltage AE_Vref. While such variances may be corrected by calibrating the voltage level of the AE threshold voltage signal, there is a desire and need for an anti-eclipse circuit which minimizes post manufacturing calibrations.

SUMMARY OF THE INVENTION

Exemplary embodiments of the present invention provide for an anti-eclipse circuit for an imager. The anti-eclipse circuit is formed from pixel circuitry over the same semiconductor substrate as the imaging pixels. More specifically, two adjacent pixel circuits are modified to form an amplifier. One input of the amplifier is adapted to receive a reset signal from one of the pixel circuits while another input is adapted to be set at a predetermined offset voltage from the output of the amplifier. The amplifier is preferably a unity gain amplifier, so that the output of the amplifier is set to a voltage level equal to the predetermined offset from the voltage level of the reset signal.

Since the anti-eclipse circuit is affected by the same fabrication processing conditions as the imaging array pixels and may reliably provide a voltage reference for the anti-eclipse circuit without requiring extensive post fabrication calibration.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
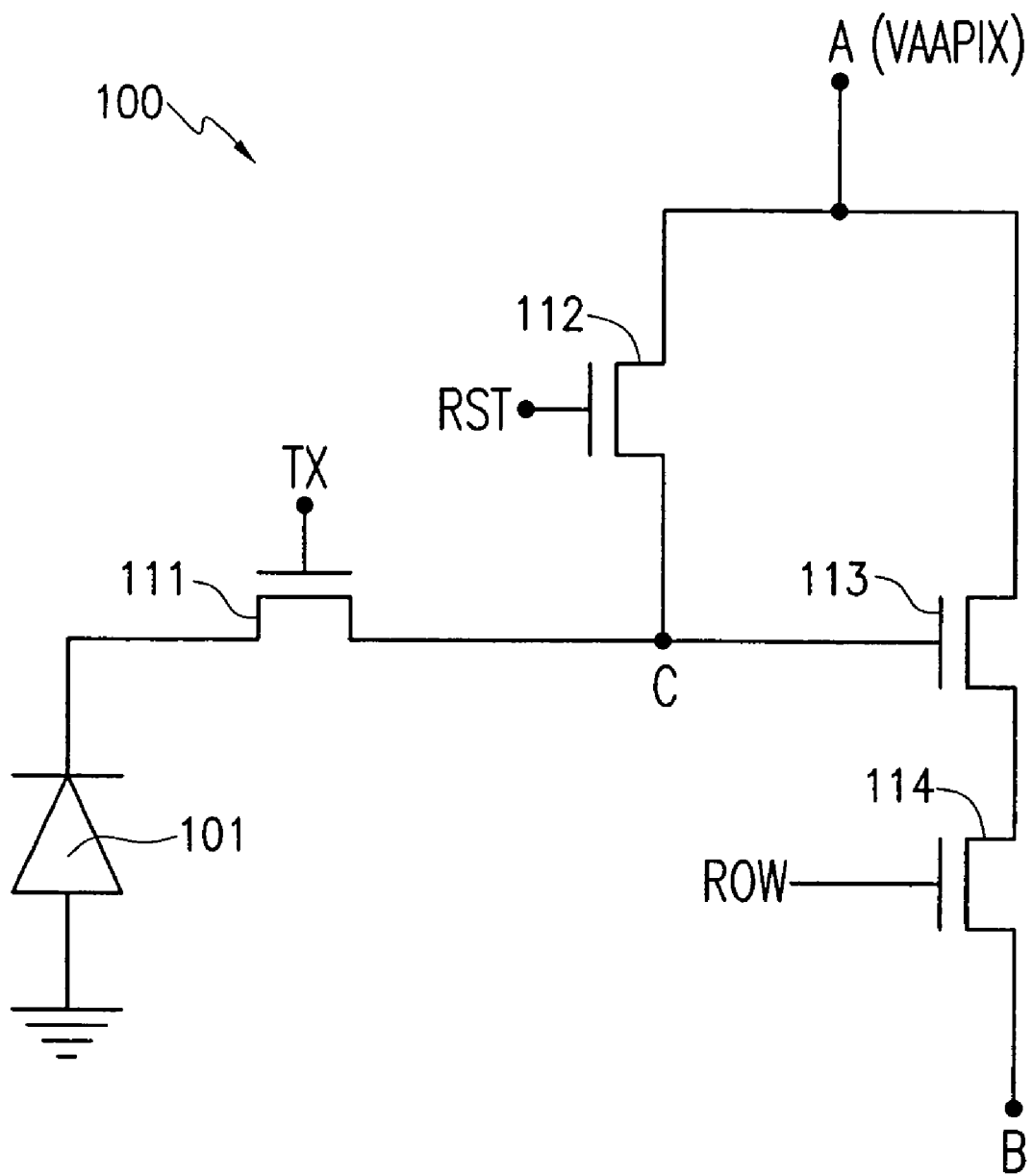
FIG. 1 illustrates a conventional pixel.

Now referring to the drawings, where like reference numerals designate like elements, there is shown in FIG. 6 is an illustration of a circuit 600 for generating the anti-eclipse threshold voltage AE_Vref in accordance with an exemplary embodiment of the invention. The circuit 600 is preferably formed on the same integrated circuit as at least the pixel array 201 and column circuit 220 of an associated imager, but is not otherwise part of the array of pixels generating image signals.

The circuit 600 generates the anti-eclipse threshold voltage AE_Vref for each of the anti-eclipse circuits 310 (FIG. 3) of an imager 200. As explained in greater detail below, portions of the circuit 600 are modifications of pixel circuits (e.g., a non-image pixels whose output would not be further processed). By utilizing modified pixel circuits on the same integrated circuit as the pixel array and the column circuit 220, the circuit 600 is subject to the same semiconductor fabrication induced variances as the image pixels 100 of the imager 200, and thus produces an anti-eclipse threshold voltage AE_Vref which can be at a predetermined offset from the reset signal voltage level despite changes to the reset signal voltage level caused by such variances.

The circuit 600 is organized as three overlapping blocks 601, 602, and 603, an offset voltage generator 630, and an optional sample-and-hold circuit 650. The circuit 600 includes three power input node A1, A2, and A3, each for accepting pixel power VAAPIX, and three control signal input nodes X1, X2, and Y, an output signal node Z, and internal nodes C, I+, I−, IL, and OUT, as further described below. Internal node IL is coupled to a load circuit 390'.

Figure 2:
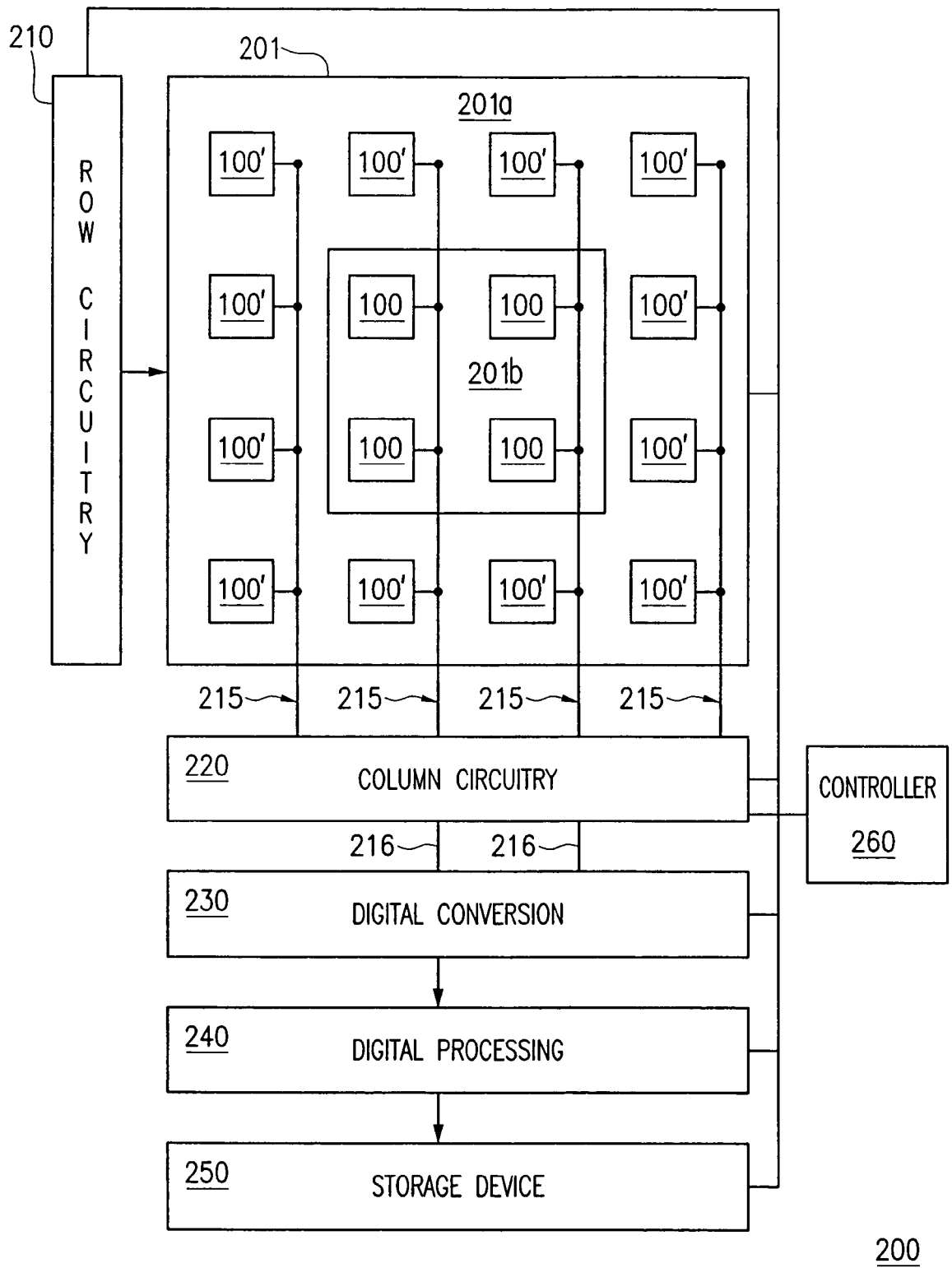
FIG. 2 illustrates an imager utilizing the pixel of FIG. 1.

Block 601 is preferably a modification of a pixel circuit 100 (FIG. 1) used in the imager associated with circuit 600. Block 601 includes the light sensitive element 101 (which may be a photo-diode shielded from incident light when used in circuit 601), N-channel transfer transistor 111, N-channel reset transistor 112, N-channel first source follower transistor 113a, an N-channel first row select transistor 114a, and the floating diffusion node C. The gate of the first source follower transistor 113a corresponds to internal node I+. In circuit 601, the gate of the transfer transistor 111 is permanently coupled to a predetermined voltage that causes the transfer transistor 111 to remain off and not conducting, similar to an imaging pixel operation during a reset operation. In one exemplary embodiment, the gate of the transfer transistor 111 is coupled to a ground potential. Similar to pixel 100, one source/drain of the reset transistor 112 is coupled to pixel power VAAPIX (via node A1) and another source/drain of the reset transistor 112 is coupled to the floating diffusion node C. The gate of the reset transistor 112 corresponds to node Y and is coupled to control signal AE_RST, which is a control signal which follows the state of the RST control signal for the selected row in the pixel array 201 (FIG. 2). The first source follower transistor 113a has its gate coupled to the floating diffusion node C, one source/drain coupled to a source/drain of the row select transistor 114a, and another source/drain coupled to node I1, which receives pixel power VAAPIX via transistor 610 and node A2 of circuit 603. The gate of the first row select transistor 114a is coupled to node X1 to receive control signal AE_ROW, which is a control signal that follows the state of the ROW control signal for the selected row in the pixel array 201. Another source/drain of the first row select transistor 114a is coupled, via node I2, to a load circuit 390'.

The function of the portion of block 601 not shared with block 603 is to provide a signal to node I+. That signal is equivalent to a nominal reset signal produced by a pixel 100 (FIG. 1) of the imager 200 (FIG. 2). More specifically, when control signal AE_RST is asserted high to cause transistors 112 to conduct, the signal flowing between to node I+ from node C is equal to the reset signal produced by a pixel 100 under non-eclipse conditions. This signal does not require calibration because the circuit 601 shares a similar design and is fabricated on the same integrated circuit as the pixels 100 of the imager 200, and thus shares the same semiconductor fabrication inducted variances. Block 601 is not subject to eclipse distortion because its light sensitive element 101 is shielded from incident light.

Block 602 is also preferably a modification of the pixel circuit 100 (FIG. 1) used in the imager 200 associated with the circuit 600. For example, block 602 includes a second N-channel source follower transistor 113b and a second N-channel row select transistor 114b. The transistors 113b and 114b are coupled in series via their source and drains. The gate of the second source follower transistor 113b corresponds to node I−, while the source/drain of the second row select transistor 113b not coupled to the second row select transistor 114b corresponds to node OUT. The gate of the second row select transistor 114b corresponds to node X2. The offset voltage generator 630 is coupled between nodes I− and OUT, and accepts a control signal IN. The offset voltage generator 630 is preferably a digital-to-analog converter having a digital input accepting control word IN, a negative output terminal coupled to node OUT, and an analog output coupled to node I−. The offset voltage generator 630 forces a voltage difference, based on the contents of control word IN, between nodes I− and OUT. The digital word may be supplied by a controller, such as controller 260 (FIG. 2) of the imager 200.

The largest block is block 603, which forms an amplifier in which the positive and negative inputs are respectively applied at terminals I+ and I−, while the output AE_Vref is supplied at node OUT. Node OUT may also be coupled to a sample-and-hold circuit 650, which could be used to present the AE_Vref voltage at the output of the sample-and-hold circuit. Block 603 includes node IL, which is coupled to the source/drains of the first and second row select transistors 114a, 114b. Node IL is also coupled to load circuit 390', which in one exemplary embodiment comprises a transistor 640 biased to flow twice the current of a standard load circuit 390.

Figure 6A:
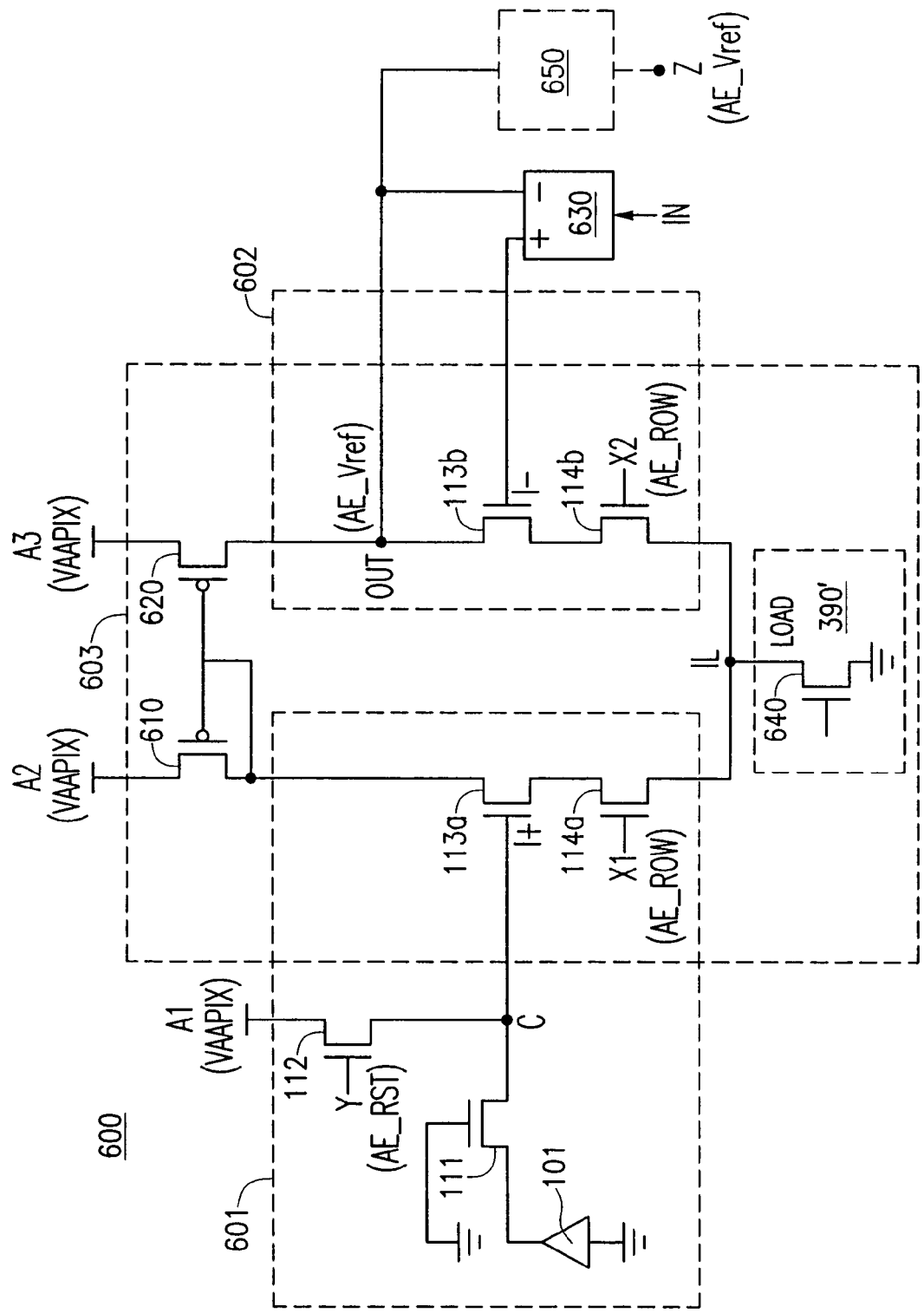
FIG. 6A illustrates a circuit for generating an anti-eclipse threshold voltage in accordance with a first exemplary embodiment of the present invention.
Figure 6B:
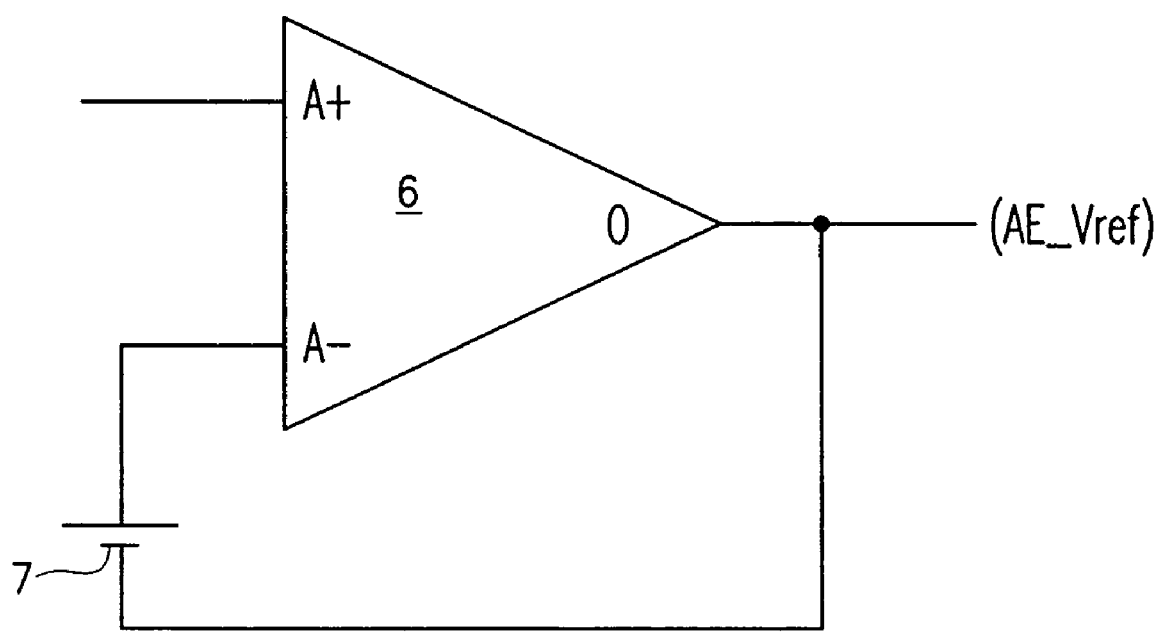
FIG. 6B is a simplified block diagram useful for illustrating the operation of the circuit illustrated in FIG. 6A.

FIG. 6B is a simplified diagram useful for explaining the operation of the circuit 600 of FIG. 6A. FIG. 6B illustrates an amplifier 6 having positive and negative inputs A+, A−, and an output O and a battery 7 for creating an offset voltage. If a voltage corresponding to a nominal reset signal level is presented to input A+, the amplifier will output at node O a voltage AE_vref which is lower than the nominal reset signal level by the magnitude of the offset voltage created by the battery.

Similarly, in FIG. 6A, the amplifier of block 603 is formed from transistor 610, 620, load circuit 390', and certain portions of two modified pixel circuits 601, 602. The portion of block 601 which does not overlap with block 603 produces the nominal reset signal voltage level. The offset voltage is generated by the offset voltage generator 630. Block 603 produces at node OUT the AE_Vref voltage at a voltage level equal to the VAAPIX voltage level minus the offset voltage created by the offset voltage generator 630.

Figure 3:
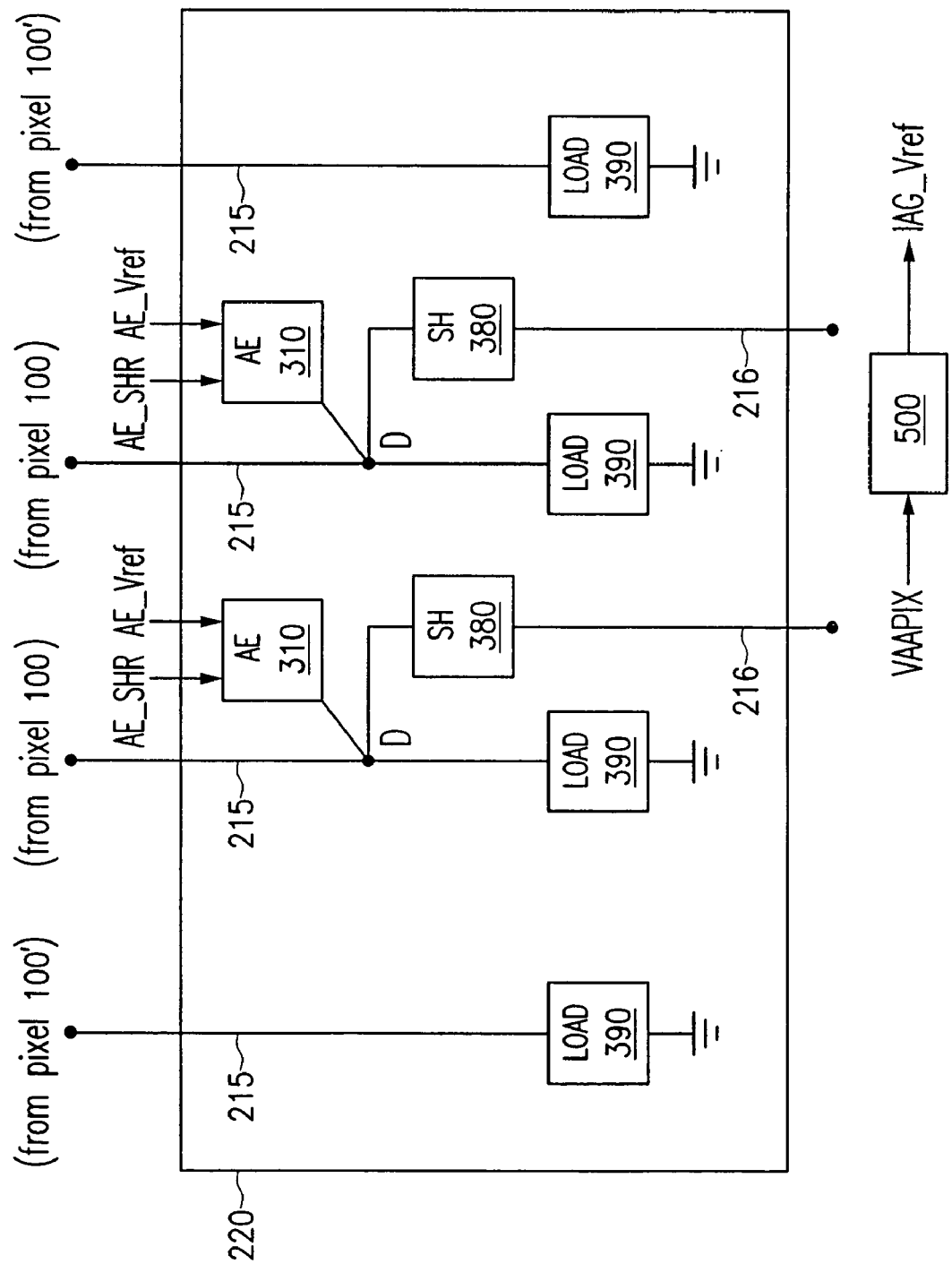
FIG. 3 illustrates column circuitry from the imager of FIG. 2.
Figure 4:
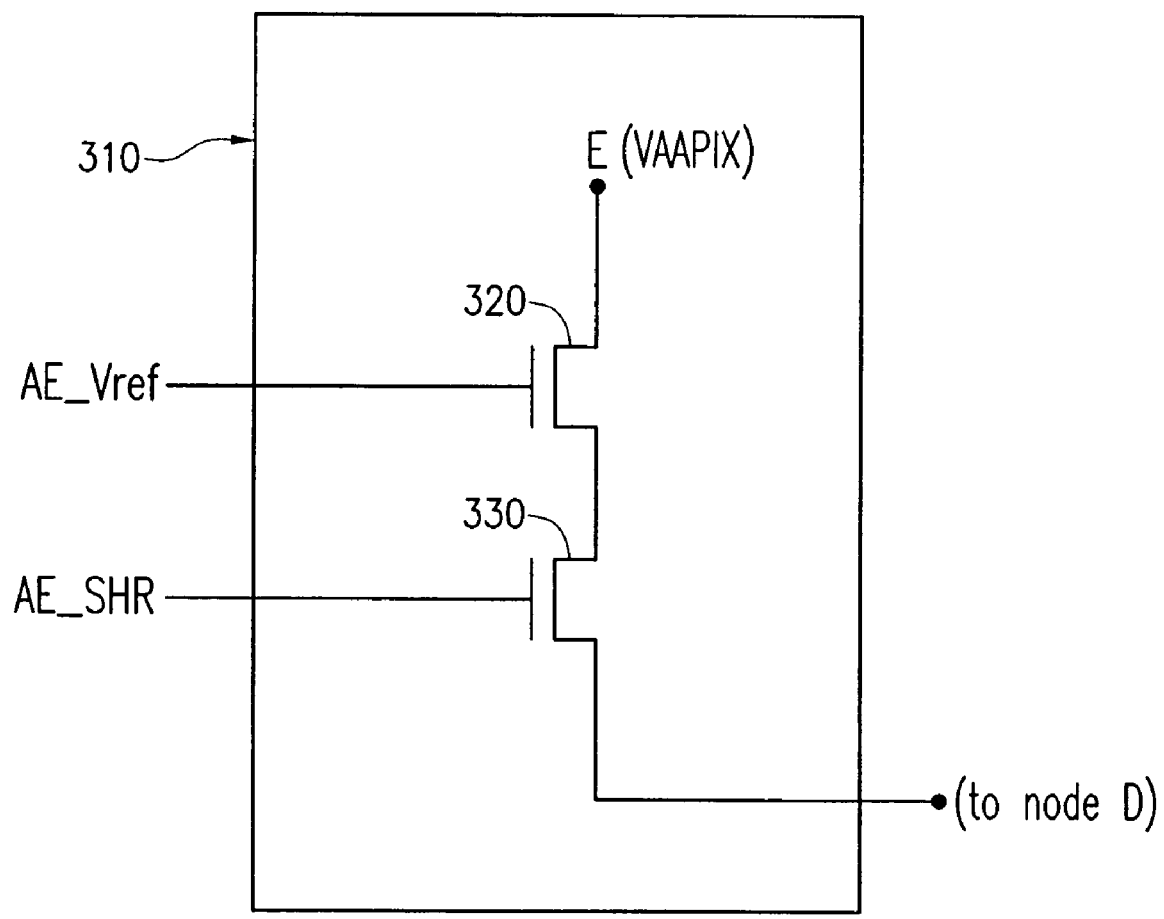
FIG. 4 illustrates an anti-eclipse circuit.
Figure 5:
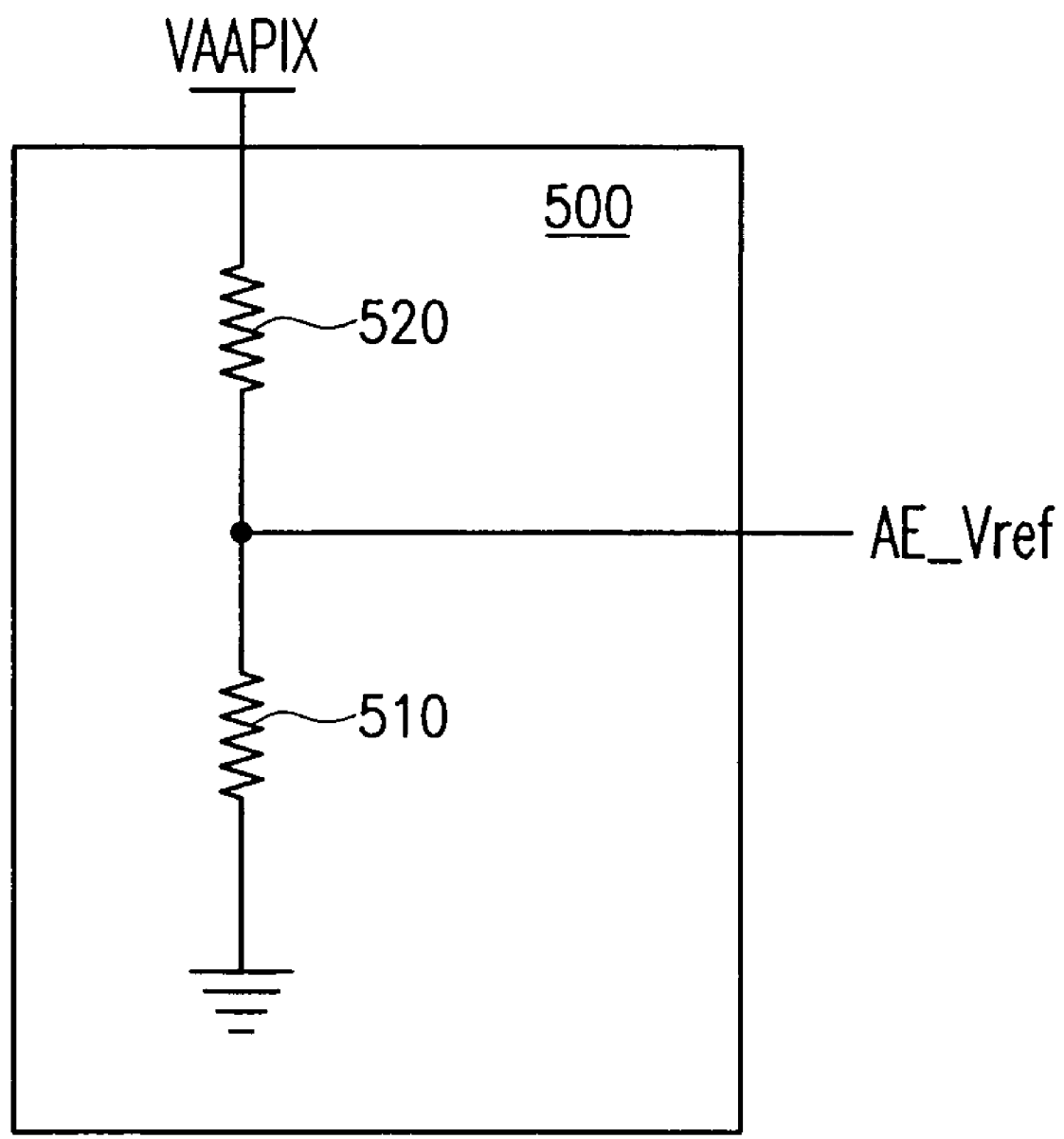
FIG. 5 illustrates a circuit for generating an anti-eclipse threshold voltage.
Figure 7:
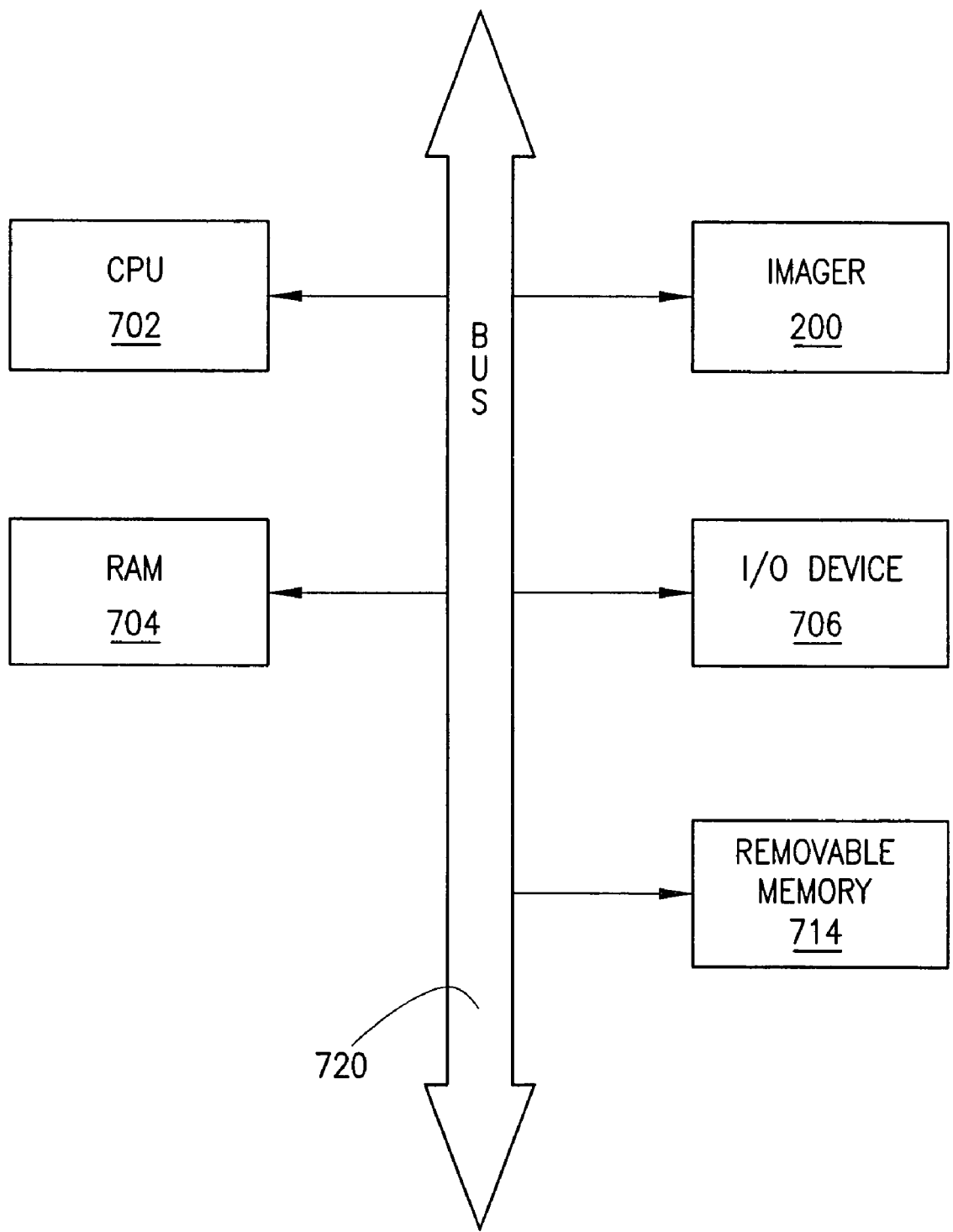
FIG. 7 illustrates a system incorporating the imager having the circuit of FIG. 6.

FIG. 7 illustrates a processor based system 700. The system 700 is exemplary of a digital system having an imaging device. Without being limited, system 700 could be a part of a computer system, camera, scanner, machine vision system, vehicle or personal navigation system, portable telephone with camera, video phone, surveillance system, auto focus system, optical tracking system, image stabilization system, motion detection system, or other system having an imaging function. System 700, for example, a camera, generally comprises a bus 720. Coupled to the bus 720 are a processor, such as CPU 702, a memory, such as a RAM 704, a removable memory 714, an I/O device 706, and an imager 200 including the circuit 600 of the present invention for generating the reference voltage for its anti-eclipse circuits 310 (FIG. 3).

It should be appreciated that other embodiments of the invention include a method of manufacturing the circuit 600.

For example, in one exemplary embodiment, a method of manufacturing an anti-eclipse circuit includes the steps of providing, over a portion of a substrate corresponding to a single integrated circuit, at least a plurality of imaging pixels 100, a column circuitry 220, and circuit 600. The pixels 100, column circuitry 220, and circuit 600 can be fabricated on a same integrated circuit using known semiconductor fabrication techniques.

The present invention therefore takes advantage of the likelihood that modified pixel circuits located on the same integrated circuit as the pixels of the pixel array and the column circuitry of an imager would have identical semiconductor fabrication induced process variances. Ideally, a non-imaging pixel is modified to become part of a reference voltage generator. The reference voltage generator is designed to produce a voltage equal to a controllable offset from the ordinary reset signal voltage level of a pixel of the imager, despite differences in such voltage from imager to imager caused by the semiconductor fabrication process.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An imager circuit comprising:
    an array of pixels including a plurality of imaging pixels for producing respective reset signals and image output signals;
    an anti-eclipsing circuit for adjusting the level of said reset signals and utilizing a reference voltage; and
    a reference voltage generation circuit for generating said reference voltage in response to signals which are affected by fabrication conditions which affect the reset signal produced by said imaging pixels, the reference voltage generation circuit comprising:
        at least one non-imaging pixel for producing a nominal reset signal; and
        a voltage circuit for producing said reference voltage as an offset from a voltage level of said nominal reset signal.

2. The imager circuit of claim 1, wherein said array of pixels, said anti-eclipsing circuit, and said reference voltage generation circuit are located on a same integrated circuit.

3. The imager circuit of claim 1, wherein said at least one non-imaging pixel further comprises:
    a floating diffusion node; and
    a transfer transistor, coupled by its source and drain between a light sensitive element and said floating diffusion node, said transfer transistor having a gate coupled to a potential source causing said transfer transistor to remain in a non-conducting state.

4. The imager circuit of claim 1, said reference voltage generation circuit further comprising a load circuit coupled to said non-imaging pixel for receiving said nominal reset signal, and
    wherein said voltage circuit comprises:
        a current mirror for producing a mirrored signal identical to said nominal reset signal; and
        an offset circuit for producing said reference voltage as an offset from a voltage level of said mirrored signal.

5. The imager circuit of claim 4, wherein said offset circuit further comprises a transistor, said transistor having a first source/drain coupled to receive said mirrored signal, a second source/drain coupled to said load circuit, and a gate coupled to an offset voltage generator for creating an offset voltage between said first source/drain and said gate.

6. The imager circuit of claim 5, wherein said offset voltage generator comprises an digital to analog converter, said digital to analog converter having an analog output coupled to said gate of said transistor and a ground power terminal coupled to said first source/drain.

7. The imager circuit of claim 1, further comprising a sample-and-hold circuit, coupled to said reference voltage generation circuit, said sample-and-hold circuit adapted to sample and hold said reference voltage.

8. An imager comprising:
    an array of pixels including a plurality of imaging pixels for producing respective reset signals and image output signals;
    a column circuit, coupled to said array of pixels, for selecting a row of pixels from said array for processing;
    a plurality of anti-eclipsing circuits for adjusting the level of said reset signals received from the selected row of pixels and utilizing a reference voltage; and
    a reference voltage generation circuit for generating said reference voltage in response to signals which are affected by fabrication conditions which affect the reset signal produced by said imaging pixels, the reference voltage generation circuit comprising:
        at least one optically black pixel for producing a nominal reset signal; and
        a voltage circuit for producing said reference voltage as an offset from a voltage level of said nominal reset signal.

9. The imager of claim 8, wherein said array of pixels, said anti-eclipsing circuits, and said reference voltage generation circuit are located on a same integrated circuit.

10. The imager of claim 8, wherein said at least one optically black pixel further comprises:
    a floating diffusion node; and
    a transfer transistor coupled by its source and drain between a light sensitive element and said floating diffusion node, said transfer transistor having a gate coupled to a potential source causing said transfer transistor to remain in a non-conducting state.

11. The imager of claim 8, said reference voltage generation circuit further comprising a load circuit coupled to said optically black pixel for receiving said nominal reset signal, and
    wherein said voltage circuit comprises:
        a current mirror for producing a mirrored signal identical to said nominal reset signal; and
        an offset circuit for producing said reference voltage as an offset from a voltage level of said mirrored signal.

12. The imager of claim 11, wherein said offset circuit further comprises a transistor, said transistor having a first source/drain coupled to receive said mirrored signal, a second source/drain coupled to said load circuit, and a gate coupled to an offset voltage generator for creating an offset voltage between said first source/drain and said gate.

13. The imager of claim 12, wherein said offset voltage generator comprises a digital to analog converter, said digital to analog converter having an analog output coupled to said gate of said transistor and a negative output terminal coupled to said first source/drain.

14. The imager of claim 8, further comprising a sample-and-hold circuit, coupled to said reference voltage generation circuit, said sample-and-hold circuit adapted to sample and hold said reference voltage.

15. An imaging system comprising:
a processor; and
an imager, coupled to said processor, said imager comprising:
an array of pixels including a plurality of imaging pixels for producing respective reset signals and image output signals;
a column circuit, coupled to said array of pixels, for selecting a row of pixels from said array for processing;
a plurality of anti-eclipsing circuits for adjusting the level of said reset signals received from the selected row of pixels and utilizing a reference voltage; and
a reference voltage generation circuit for generating said reference voltage in response to signals which are affected by fabrication conditions which affect the reset signal produced by said imaging pixels, the reference voltage generation circuit comprising:
at least one non-imaging pixel for producing a nominal reset signal; and
a voltage circuit for producing said reference voltage as an offset from a voltage level of said nominal reset signal.

16. The imaging system of claim 15, wherein said array of pixels, said anti-eclipsing circuits, and said reference voltage generation circuit are located on a same integrated circuit.

17. The imaging system of claim 15, wherein said at least one non-imaging pixel further comprises:
a floating diffusion node; and
a transfer transistor, coupled by its source and drain between a light sensitive element and said floating diffusion node, said transfer transistor having a gate coupled to a potential source causing said transfer transistor to remain in a non-conducting state.

18. The imaging system of claim 15, further comprising a load circuit, coupled to said non-imaging pixel for receiving said nominal reset signal, and
wherein said voltage circuit comprises:
a current mirror for producing a mirrored signal identical to said nominal reset signal; and
an offset circuit for producing said reference voltage as an offset from a voltage level of said mirrored signal.

19. The imaging system of claim 18, wherein said offset circuit further comprises a transistor, having a first source/drain coupled to receive said mirrored signal, a second source/drain coupled to said load circuit, and a gate coupled to an offset voltage generator for creating an offset voltage between said first source/drain and said gate.

20. The imaging system of claim 19, wherein said offset voltage generator comprises a digital to analog converter, said digital to analog converter having an analog output coupled to said gate of said transistor and a ground power terminal coupled to said first source/drain.

21. The imaging system of claim 15, further comprising a sample-and-hold circuit, coupled to said reference voltage generation circuit, said sample-and-hold circuit adapted to sample and hold said reference voltage.

22. A method for forming an imaging circuit, comprising:
providing a semiconductor substrate;
forming, over said semiconductor substrate, an array of pixels including a plurality of imaging pixels for producing respective reset signals and image output signals, said imaging pixels configured to produce said image output signals according to incident light;
forming, over said semiconductor substrate, an anti-eclipsing circuit for adjusting the level of said reset signals and utilizing a reference voltage;
forming, over said semiconductor substrate, a reference voltage generation circuit for generating said reference voltage in response to signals which are affected by fabrication conditions which affect the reset signal produced by said imaging pixels, the reference voltage generation circuit comprising:
at least one non-imaging pixel for producing a nominal reset signal, said at least one non-imaging pixel configured to not produce an image output signal according to incident light; and
a voltage circuit for producing said reference voltage as an offset from a voltage level of said nominal reset signal; and
forming an integrated circuit using said semiconductor substrate.

* * * * *